United States Patent [19]
Byon

[11] Patent Number: 5,646,612
[45] Date of Patent: Jul. 8, 1997

[54] METHOD FOR AVOIDING COLLISION OF VEHICLE AND APPARATUS FOR PERFORMING THE SAME

[75] Inventor: Sung-Kwang Byon, Seoul, Rep. of Korea

[73] Assignee: Daewoo Electronics Co., Ltd., Seoul, Rep. of Korea

[21] Appl. No.: 580,584

[22] Filed: Dec. 29, 1995

[30] Foreign Application Priority Data

Feb. 9, 1995 [KR] Rep. of Korea ............ 95-2319

[51] Int. Cl.⁶ .......................................... G08G 1/16
[52] U.S. Cl. .................. 340/903; 340/901; 340/436; 340/588; 364/426.041; 364/461
[58] Field of Search ................. 340/901, 903, 340/436, 588; 342/118; 364/461, 426.04; 348/148, 149, 164, 169, 170

[56] References Cited

U.S. PATENT DOCUMENTS

| | | | |
|---|---|---|---|
| 5,015,991 | 5/1991 | Barr | 340/457 |
| 5,166,789 | 11/1992 | Myrick | 348/164 |
| 5,210,521 | 5/1993 | Hojell | 340/903 |
| 5,224,045 | 6/1993 | Stasell | 364/426.04 |
| 5,237,308 | 8/1993 | Nakamura | 340/588 |
| 5,249,128 | 10/1993 | Markandey | 340/903 |
| 5,249,157 | 9/1993 | Taylor | 340/903 |
| 5,349,430 | 9/1994 | Yamamoto | 340/903 |
| 5,357,438 | 10/1994 | Davidian | 340/436 |
| 5,410,304 | 4/1995 | Hahn et al. | 340/903 |
| 5,467,072 | 11/1995 | Michael | 340/903 |
| 5,467,284 | 11/1995 | Yoshioka | 364/461 |
| 5,515,448 | 5/1996 | Hishitani | 340/903 |

FOREIGN PATENT DOCUMENTS

| | | | |
|---|---|---|---|
| 0590588 | 4/1994 | European Pat. Off. | 340/903 |
| 2262829 | 6/1993 | United Kingdom | 340/903 |

OTHER PUBLICATIONS

Improved Backup Alarm Technolog for Mobile Mining Equipment by Guy A. Johnson, et a., Information Circular 9079.

*Primary Examiner*—Brent A. Swarthout
*Assistant Examiner*—Van T. Trieu
*Attorney, Agent, or Firm*—Beveridge, DeGrandi, Weilacher & Young LLP

[57] ABSTRACT

An apparatus which determines a kind of an object to warn a driver based on the kind of the object and properly performs deceleration and braking operations based on a position of the object and a speed of the vehicle is disclosed. An infrared-ray camera is employed to detect a shape and a temperature of the object. A digital signal processing technique is utilized for displaying the temperature distribution of the object. Therefore, using the apparatus, it is able to distinguish the shape and the kind of the object in the night time and the vehicle is suitably decelerated and/or stopped based on conditions.

16 Claims, 4 Drawing Sheets

METHOD FOR AVOIDING COLLISION OF VEHICLE AND APPARATUS FOR PERFORMING THE SAME

BACKGROUND OF THE INVENTION

1. Field of the Invention

The present invention relates to a collision avoidance system of a vehicle, and more particularly to a collision avoidance system of a vehicle that is capable of distinguishing an object ahead of the vehicle, whether it is a creature or not, by means of infrared rays and digital signal processing.

2. Description of the Prior Art

There is a continuing increase in the density of vehicles traveling the world's roadways, and simultaneously, an increasing emphasis on improving the safety of highway and ordinary roadway vehicles operations by preventing vehicles from colliding with stationary and moving objects (such as roadside obstacles and other vehicles). One means for accomplishing this is to detect or monitor the relative speed, the direction of travel, and the distance between vehicles sharing the roadway, and to use such information to provide direct indications to the vehicle's driver of potential danger. It is becoming increasingly more common for automotive engineers to consider the use of microwave radar systems as a means of monitoring or detecting such environmental conditions.

The microwave radar system is realized in a navigation apparatus which is mainly utilized in an airplane or ship. One collision avoidance system adapts the navigation apparatus to a vehicle. Vehicle borne radar systems which transmit and receive three frequencies on a time division basis, with two of the frequencies being used to determine the range, and the third being combined with one of the first two to determine the closing speed and the likelihood of collision. One such system is disclosed in U.S. Pat. No. 3,952,303, dated Apr. 20, 1976 to Watanabe et al., which is an analog radar signal processing system utilizing the Doppler effect.

However, the analog system as of the Watanabe is sensitive to temperature changes, and is difficult to calibrate. Furthermore, the Watanabe's system is dedicated to specific tasks and therefore, is difficult to upgrade and customize to meet varying requirements. Still furthermore, the transmit and receive frames in such a three frequency system can be wasteful, in that only small portions thereof are needed to determine the range and the relative rate of motion of a target, so the remaining portions of the frames are unused.

The analog processing technique is fast and allows for real time processing. However, the cost of an analog circuit is typically much greater than the cost of a digital circuit. Thus, if the collision analog signal can be converted and handled by a digital signal, the cost of the system will be lowered. Additionally, a digital signal processing circuit is much less sensitive to temperature, manufacturing variations, and interference from noise than an analog signal processing circuit.

A radar-operated collision avoidance system is disclosed in U.S. Pat. No. 4,072,945, dated Feb. 7, 1978 to Katsumata et al. Katsumata's system detects the relative speed and the relative distance of an object and determines whether the vehicle is approaching the object at a dangerously high speed. The minimum allowable distance between a vehicle and a object is stored in the memory of a computer as a digital code, and is then compared to the distance detected by the radar.

U.S. Pat. No. 4,626,850, dated Dec. 2, 1986 to Young H. Chey, discloses a dual operational mode vehicle detection and collision avoidance apparatus. Chey's apparatus uses a single active or passive ultrasonic ranging device, and is adapted to scan the rear and the lateral sides of the vehicle to warn the vehicle driver of any danger when the vehicle is changing lanes.

U.S. Pat. No. 5,302,965, issued to Jimmie R. Asbury et al. in Apr. 12, 1994, describes a multi-frequency and multi-object vehicle radar system. Jimmie's system utilizes two transmit and receive channels to determine the relative speed and the range of an object by determining the frequency and the difference in phase of the two channels.

All of the radars employed in the above-described U.S. patents use microwave radars as a part of its scanning and detecting apparatuses. The disadvantage of these patents is related to the beam width, that is the angular width of a main lobe of the radar, and to the associated angular resolution of the microwave radar.

The beam width is inversely proportional to the antenna diameter in wavelength. Therefore, the antenna should be large enough so as to reduce the beam width, but the size of the antenna shall be restricted when it is equipped to a vehicle. Consequently, it is very difficult to make a reasonable size microwave radar with a beam width less than 3 degrees.

For a desired scanning distance, a beam width of more than 3 degrees will scan an area which is much too big and thus, is too nonspecific and too difficult to differentiate the received echoes. Even though the echoes reflected from another preceding vehicle are received, the radar also receives signals from other objects close to the road, i.e., the echoes reflected from trees, posts, bridges across a nearby expressway. On an expressway with divided lanes, a microwave radar will receive echoes reflected from the vehicles that are within two or three lanes, and will not differentiate these echoes from echoes coming from objects in the same lane of the road. Because of the poor angular resolution of a microwave radar, the direction of objects can not be specifically determined and objects too close to one another cannot be separated.

A vehicle collision avoidance system using a laser radar in order to solve the aforementioned problems is disclosed in U.S. Pat. No. 5,314,037, issued to David C. H Shaw et al. in May 24, 1995. Shaw's system includes a laser radar with transmitters and receivers, a computer, a warning device, and an optional automatic braking device. A steering wheel rotation sensor, or laser gyroscope, is utilized to give information about a system-equipped vehicle's directional change. Shaw's system compares a predicted collision time with the minimum allowable time for determining the immanency of a collision to warn a driver of danger. Unless a driver responds to the warning, the optional automatic braking device is operated.

When the object is a human, a moving speed of the human is considerably slower than that of a vehicle. Also, the advancing direction of the human can be arbitrarily changed in accordance with his mental activity, which cannot be predicted. Thus, if the object is a human, it is necessary to decelerate the vehicle or to activate the braking operation to prepare for an emergency.

However, Shaw's system has the disadvantage of not being able to distinguish whether the detected object is a creature or not, and so not being able to selectively perform the deceleration or braking operation in accordance with the kind of the object detected, i.e., a living creature (human) or an inanimate object.

SUMMARY OF THE INVENTION

It is a first object of the present invention to provide a method for avoiding the collision of a vehicle by determining whether an object positioned ahead or to the side of the vehicle is a creature or not, in order to selectively perform the deceleration and/or the braking operation of the vehicle in accordance with the result of the determination.

It is a second object of the present invention to provide a system for avoiding the collision of a vehicle by determining whether an object positioned ahead or to the side of the vehicle is a creature or not in order to selectively perform the deceleration and/or the braking operation of the vehicle in accordance with the result of the determination.

To achieve the above first object of the present invention, there is provided a method for avoiding the collision of a vehicle, the method comprises:

A) detecting a shape and a temperature distribution of an object ahead of and/or aside of the vehicle, and a position of the object, a speed of the vehicle, an operational status of a brake and an opening angle of a throttle valve so as to generate a shape signal, a temperature distribution signal, a position signal, a speed signal, a pedal footing signal and an angle signal;

B) filtering and converting the shape signal, temperature distribution signal, position signal, speed signal, pedal footing signal and angle signal into digital signals, processing the shape signal and the temperature distribution signal by means of digital signal processing technique and generating a body temperature signal and temperature distribution display signal by calculating an temperature distributing area of the shape of the object;

C) determining a kinds of the object by receiving the body temperature signal, estimating a predicted collision time, a predicted braking time, a predicted decelerating time and a braking start time by receiving the position signal and speed signal, determining one of cases of braking, decelerating and braking with decelerating the vehicle by using the predicted collision time, the predicted braking time, the predicted decelerating time and the braking start time, and generating an alarm signal and a control signal by receiving the shape signal, the temperature distribution display signal and the angular signal;

D) alarming a driver statuses of decelerating and braking of the vehicle according appearance of the object according to the alarm signal; and E) decelerating and braking the vehicle according to the control signal.

The method for avoiding the collision of a vehicle according to the present invention utilizes infrared rays for detecting a shape signal and a temperature distribution signal during the detection.

The digitized shape signal and temperature distribution signal are received to eliminate the temperature distribution outside the shape of an object, and to assign respective colors to the temperatures distributed within the shape of the object. At this time, areas of the temperatures distributed throughout the shape of the object are calculated to generate a temperature distribution display signal, and to calculate the most widespread temperature within the shape of the object. As the consequence, the most prevailing temperature within the shape of the object becomes the body temperature of the object.

In the method for avoiding the collision of the vehicle according to the present invention, a body temperature signal is compared with a preset value to determine whether the object is a human, an animal, or an inanimate object. Upon determining the kind of the object, the driver is warned of the appearance of the object in accordance with the kind of the object it is, and the speed of the vehicle is controlled.

To achieve the above another object of the present invention, there is provided a system for avoiding the collision of a vehicle, the system comprises:

a means for detecting a shape and a temperature distribution of an object ahead of and/or aside of the vehicle, and a position of the object, a speed of the vehicle, an operational status of a brake and an opening angle of a throttle valve so as to generate a shape signal, a temperature distribution signal, a position signal, a speed signal, a pedal footing signal and an angle signal;

a signal processing means for filtering and converting the shape signal, temperature distribution signal, position signal, speed signal, pedal footing signal and angle signal into digital signals, processing the shape signal and the temperature distribution signal by means of digital signal processing technique and generating a body temperature signal and temperature distribution display signal by calculating an temperature distributing area of the shape of the object;

a means for determining a kinds of the object by receiving the body temperature signal, estimating a predicted collision time, a predicted braking time, a predicted decelerating time and a braking start time by receiving the position signal and speed signal, determining one of cases of braking, decelerating and braking with decelerating the vehicle by using the predicted collision time, the predicted braking time, the predicted decelerating time and the braking start time, and generating an alarm signal and a control signal by receiving the shape signal, the temperature distribution display signal and the angular signal;

a means for alarming statuses of decelerating and braking of the vehicle according appearance of the object according to the alarm signal; and a means for decelerating and braking the vehicle according to the control signal.

The system for avoiding the collision of a vehicle according to the present invention is equipped with a camera, which utilizes infrared rays at the front of the vehicle to detect the shape signal and temperature distribution signal.

A signal processing unit primarily receives the digitized shape signal and the temperature distribution signal to assign the respective colors to the temperatures distributed within the shape of the object, and then calculates the area of the temperature distributed within the shape of the object. By doing so, the signal processing unit designates the most widespread temperature within the shape of the object as the body temperature and generates the body temperature signal.

A comparative determination unit compares the body temperature signal with the preset value to distinguish whether the object is a human, an animal or an inanimate object. When the kind of the object is determined, the comparative determination unit warns the driver of the appearance of the object in accordance with the kind of the object it is, and controls the speed of the vehicle.

BRIEF DESCRIPTION OF THE DRAWINGS

The above objects and other advantages of the present invention will become more apparent by describing in detail the preferred embodiment thereof with reference to the attached drawings, in which.

DESCRIPTION OF THE PREFERRED EMBODIMENT

Figure 1:
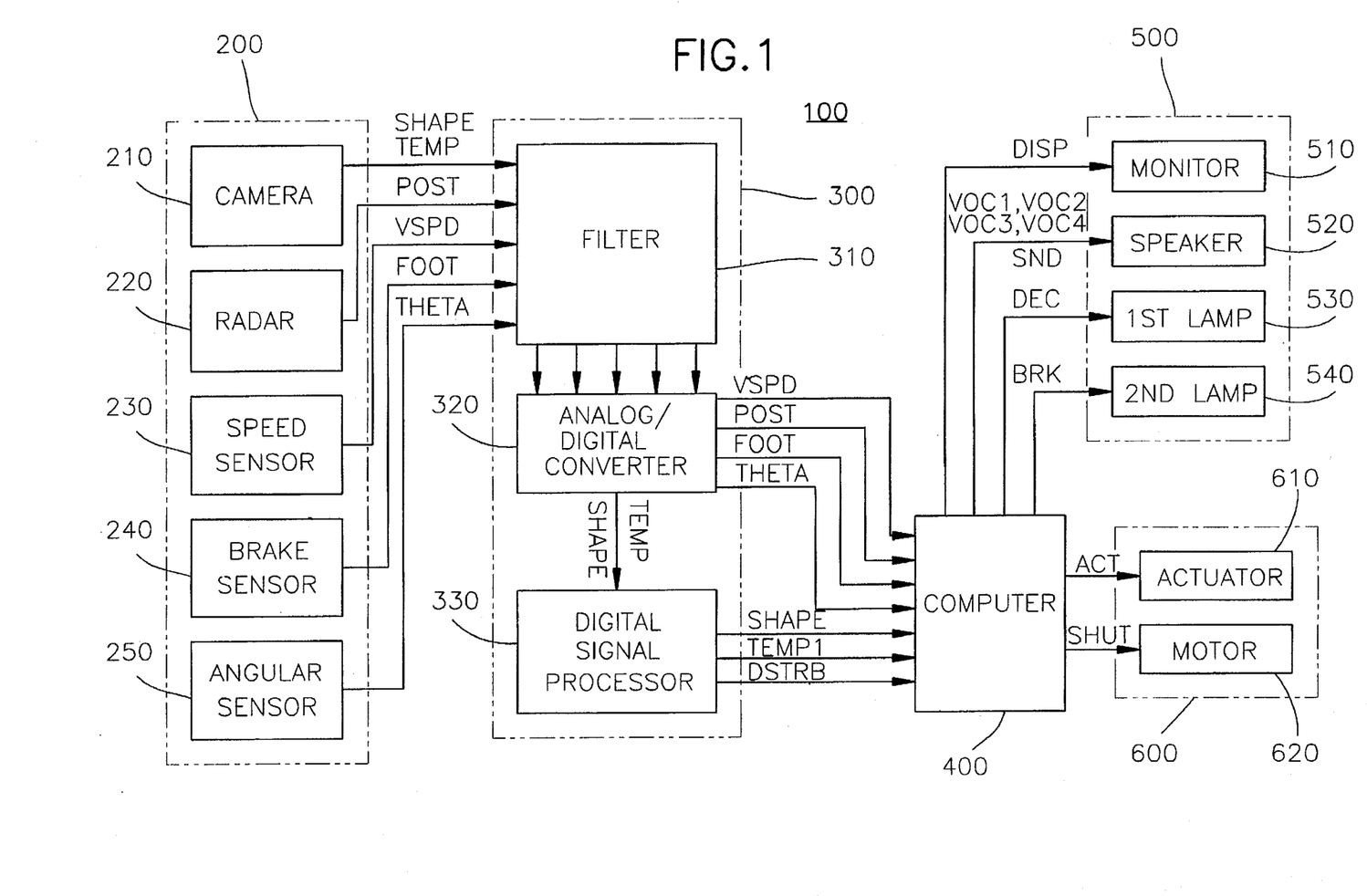
FIG. 1 is a block diagram showing a collision avoidance system of a vehicle according to one embodiment of the present invention.
Figure 2:
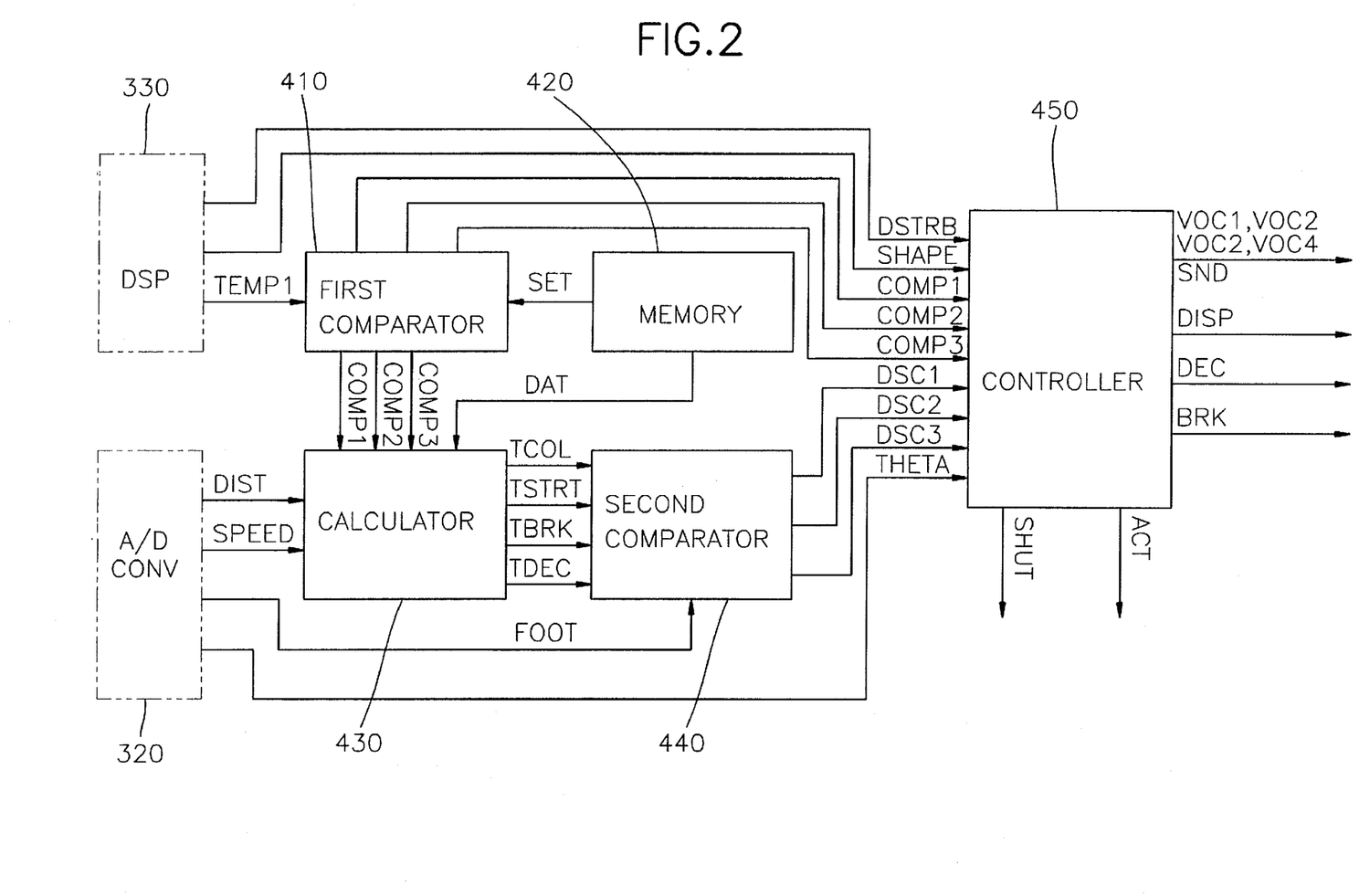
FIG. 2 is a block diagram showing the computer as shown in FIG. 1.

FIGS. 1 and 2 are block diagrams showing a collision avoidance system 100 of a vehicle, according to a preferred embodiment of the present invention. Collision avoidance system 100 according to the preferred embodiment of the present invention includes a detecting section 200 for detecting a position, a shape and a temperature distribution of an object, and for detecting a vehicle speed and a rotative angle of a throttle valve (not shown). It also includes a digital signal processing section 300 for converting the signals detected by detecting section 200 into digital signals, and for digital signal processing the resultant signals. Additionally, a computer 400 receives signals from digital signal processing section 300 and compares, calculates and controls these signals. An alarm section 500, controlled by computer 400, displays the shape and the temperature distribution of the object, and warns a driver of the appearance of the object. A braking section 600, controlled by computer 400, decelerates and brakes the vehicle.

Detecting section 200 has a camera 210 for detecting the shape and the temperature distribution of the object in front of and/or to the side of the vehicle, a radar 220 for detecting the position of the object, a speed sensor 230 for detecting the speed of the vehicle, a brake sensor 240 for detecting whether or not the driver steps on a brake pedal, and an angular sensor 250 for detecting the rotating angle of the throttle valve.

Digital signal processing section 300 has a filter 310 for filtering the signals received from detecting section 200, an analog/digital (hereinafter simply referred to as "A/D") converter 320 for converting the filtered signals into digital signals, and a digital signal processor 330 for processing the digital signals by means of a digital signal processing technique.

Computer 400 includes: a first comparator 410 for determining whether the object is a human, an animal or an inanimate object; a memory 420 for storing preset data; a calculator 430 that is driven by first comparator 410 for calculating a predicted collision time, a predicted braking time needed to stop the vehicle, a braking start time and a predicted decelerating time to need stop the vehicle by only deceleration; a second comparator 440 for receiving a signal from calculator 430 to determine the execution of the deceleration and braking operations of the vehicle; and a controller 450 for controlling alarm section 500 and braking section 600.

Alarm section 500 includes a monitor 510 for displaying the shape and the temperature distribution of the object, a speaker 520 for warning the driver by voice and sound, a first lamp 530 for warning the driver of the vehicle's decelerating state, and a second lamp 540 for warning the driver of the vehicle's braking state.

Camera 210 is installed at the front of the vehicle, and detects the shape and the temperature of the object by means of the infrared rays to generate a shape signal SHAPE and a temperature distribution signal TEMP of the object. A plurality of cameras 210, which can detect the presence of the object and the shape and the temperature distribution thereof even while driving at night, may be installed at the front, rear and side portions of the vehicle as required.

Radar 220 utilizes a laser beam. Radar 220 measures the time required for a laser beam to travel the distance between the vehicle and the object to detect the position of the object, and to generate a position signal POST. Speed sensor 230 is mounted to the vehicle to detect the speed of the vehicle so as to generate a speed signal VSPD of the vehicle.

Radar 220 may utilize ultrasonic waves to detect the position of the object. In the case where ultrasonic waves are used, the position of the object is detected by means of the Doppler effect.

Brake sensor 240 detects the vehicle's brake operation status during operation the vehicle. Once the driver operates the brake, i.e., once the driver steps on the brake pedal, brake sensor 240 generates a pedal footing signal FOOT. Angular sensor 250 detects an open angle of the throttle valve to generate an angle signal THETA.

Signal processing section 300 eliminates high frequency components and noise components from analog signals SHAPE, TEMP, POST, VSPD, FOOT, and THETA, which are received from detecting section 200, and converts analog signals SHAPE, TEMP, POST, VSPD, FOOT, and THETA into the digital signals which are then subjected to the digital signal processing.

Signal processing section 300 includes filter 310 for filtering analog signals SHAPE, TEMP, POST, VSPD, FOOT, and THETA, which are received from detecting section 200, A/D converter 320 for converting analog signals SHAPE, TEMP, POST, VSPD, FOOT, and THETA filtered via filter 310 into digital signals, and digital signal processor 330 for processing shape signal SHAPE and temperature distribution signal TEMP by means of the digital signal processing technique.

Digital signal processor 330 estimates a temperature distribution area based upon the temperature distributed within the shape of the object by processing shape signal SHAPE and temperature distribution signal TEMP of the object. When the temperature distribution within the shape is estimated, digital signal processor 330 generates a temperature distribution display signal DSTRB for displaying the respective temperatures and the corresponding areas in which the temperatures are distributed.

The respective temperatures are assigned colors by temperature distribution display signal DSTRB, and the areas occupied by the corresponding temperatures are displayed. For example, the color corresponding to a temperature above 42.1° C. is white WHITE, a temperature within the range of 38.6°~42° C. is blue BLUE, a temperature within the range of 37.5°~38.5° C. is red RED, a temperature within the range of 36.5~37.4~C. is yellow YELLOW, a temperature within the range of 35.5°~36.4° C. is green GREEN, and a temperature 36° C. is black BLACK.

Digital signal processor 330 estimates the temperature distributed across the widest area within the shape of the object to generate a body temperature signal TEMP1.

Computer 400 receives speed signal VSPD, position signal POST, pedal footing signal FOOT, and angle signal THETA from A/D converter 320, and receives body temperature signal TEMP1, shape signal SHAPE, and temperature distribution display signal DSTRB from digital signal processor 330.

Computer 400 includes first comparator 410, memory 420, calculator 430, second comparator 440, and controller 450.

First comparator 410 receives body temperature signal TEMP1 from digital signal processor 330 to compare it with a preset value SET stored in memory 420, and thereby determines whether the object is a human, an animal or an inanimate object. First comparator 410 generates a first comparison signal COMP1 when the object is determined to be a human, a second comparison signal COMP2 when the object is determined to be an animal and a third comparison signal COMP3 when the object is determined to be an inanimate object.

Calculator 430 calculates predicted collision time TCOL, necessary braking time TBRK, predicted braking time TDEC, and braking start time TSTRT by using received data DAT stored in memory 420, using position signal POST, and using speed signal VSPD from A/D converter 320.

Predicted collision time TCOL denotes the amount of the before the vehicle of running speed VSPD collides with the object. Predicted braking time TBRK is the time required for stopping the vehicle having a currently running speed VSPD by means of brake, i.e., required for making the speed of the vehicle to be zero. Predicted decelerating time TDEC is the time required for stopping the vehicle only by deceleration, without operating the brake.

Braking start time TSTRT is the minimum time capable of stopping the vehicle with a currently-running vehicle speed VSPD in order to avoid the collision with the object.

Calculator 430 estimates the above-stated predicted collision time TCOL, predicted braking time TBRK, predicted decelerating time TDEC, and braking start time TSTRT to generate a collision time signal TCOL, a predicted braking time signal TBRK, a predicted decelerating time signal TDEC, and a braking start signal TSTRT.

Second comparator 440 determines whether the vehicle is decelerating, braking, or concurrently decelerating to a stop by comparing collision time signal TCOL, predicted braking time signal TBRK, predicted decelerating time signal TDEC, and braking start signal TSTRT.

Second comparator 440 compares collision time signal TCOL with predicted decelerating time signal TDEC to determine whether the collision with the object can be avoided by decelerating the vehicle. If it is determined that the vehicle can avoid the collision with the object by only decelerating the vehicle, then second comparator 440 generates a first decision signal DSC1.

If it is determined that the vehicle cannot avoid the collision with the object by only decelerating the vehicle, then second comparator 440 compares collision time signal TCOL with predicted braking time signal TBRK to determine whether the collision with the object can be avoided by only braking the vehicle, i.e., by operating the brake. If it is determined that the collision with the object can be avoided by only braking the vehicle, second comparator 440 utilizes start signal TSTRT to decide whether it is time to start the braking operation, i.e., time to step on the brake pedal. Once braking start time TSTRT is reached, second comparator 440 determines whether the driver has stepped on the brake pedal or not by checking whether pedal footing signal FOOT has been received or not. If the driver steps on the brake pedal, second comparator 440 generates a second decision signal DSC2; if the driver has not stepped on the brake pedal, second comparator 440 generates a third decision signal DSC3.

Meantime, if collision with the object cannot be avoided only by the braking the vehicle, second comparator 440 generates a fourth decision signal DSC4.

After first comparison signal COMP1 is received from first comparator 410, controller 450 receives angle signal THETA from A/D converter 320 to generate a first voice signal VOC1 and, a shutdown signal SHUT, and receives shape signal SHAPE and temperature distribution display signal DSTRB from digital signal processor 330 to generate an object display signal DISP. First voice signal VOC1 is a signal for warning the driver that the object is a human, and closing signal SHUT is a driving signal for closing the throttle valve.

When second comparison signal COMP2 is received from first comparator 410, controller 450 generates a second voice signal VOC2 and generates object display signal DISP by using received shape signal SHAPE and temperature distribution display signal DSTRB from digital signal processor 330.

After third comparison signal COMP3 is received, controller 450 generates a third voice signal VOC3.

After first decision signal DSC1 is received from second comparator 440, controller 450 generates shutdown signal SHUT for closing the throttle valve in accordance with the rotative angle of the throttle valve by using angle signal THETA from A/D converter 320, and generates a deceleration alarm signal DEC and a sound signal SND.

After second decision signal DSC2 is received, controller 450 generates a braking alarm signal BRK and sound signal SND.

After third decision signal DSC3 is received, controller 450 generates a braking signal ACT, braking alarm signal BRK, and sound signal SND.

After fourth decision signal DSC4 is received, controller 450 generates a fourth voice signal VOC4, closing signal SHUT, braking signal ACT, sound signal SND, deceleration alarm signal DEC, and braking alarm signal BRK.

Alarm section 500 receives object display signal DISP from controller 450 to display the shape and temperature distribution of the object on monitor 510, through which the driver can observe the kind of the object with the naked eye even at night.

Also, first, second, third, and fourth voice signals VOC1, VOC2, VOC3, and VOC4 and sound signal SND are received by drive speaker 520, which thereby warns the driver. Meanwhile, alarm section 500 twinkles first lamp 530, for informing the driver of the decelerating status of the vehicle, by receiving deceleration alarm signal DEC and twinkles second lamp 540, for informing the driver of the braking status of the vehicle, by receiving braking alarm signal BRK.

Braking section 600 includes an actuator 610, for actuating brake(not shown), by receiving braking signal ACT and a motor 620 for closing the throttle valve according to shutdown signal SHUT.

More detailed description of the operation of the collision avoidance system 100 according to the preferred embodiment of the present invention will be provided hereinafter.

Figure 3:
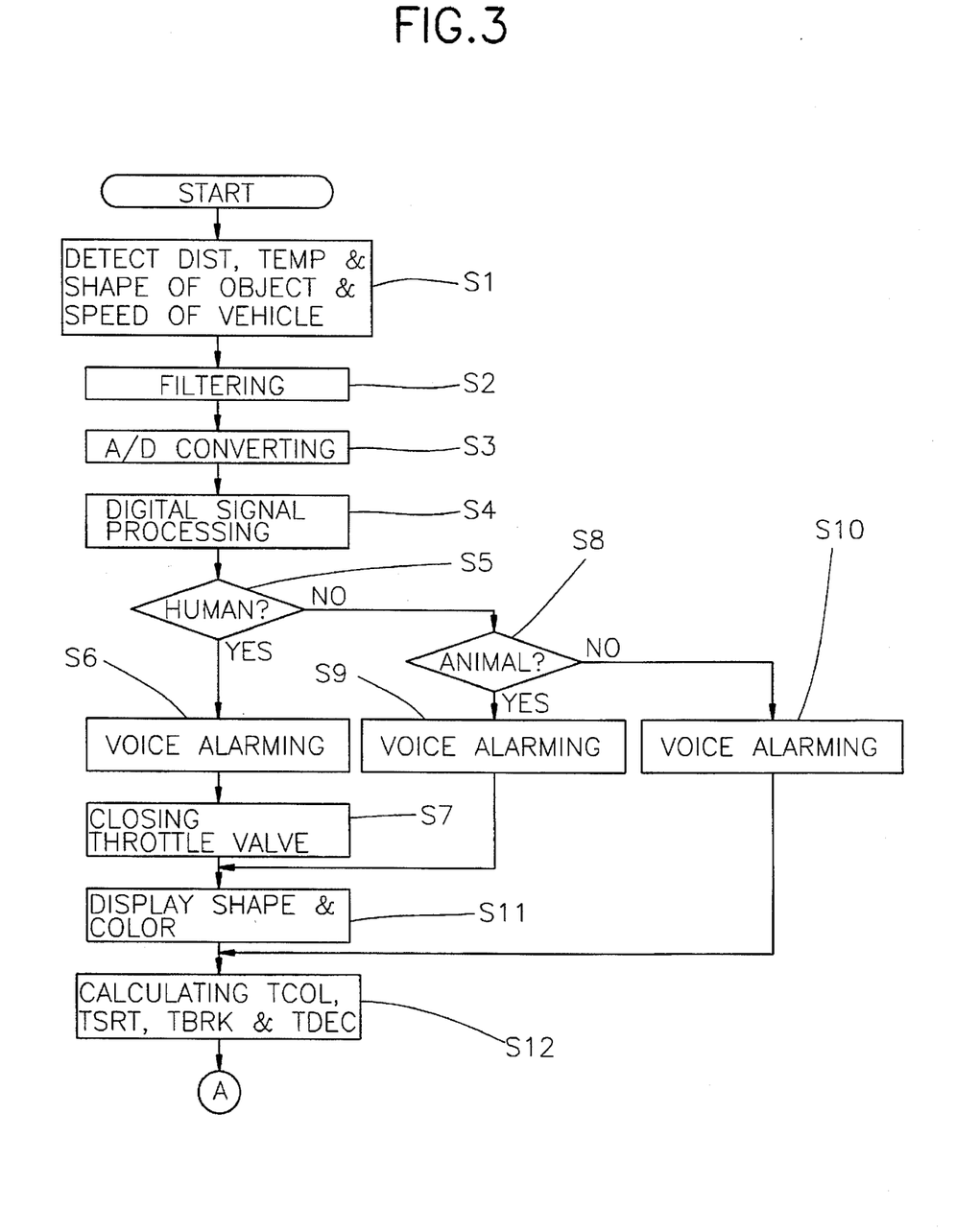
FIGS. 3 and 4 are a flow chaff for illustrating a method for avoiding the collision of a vehicle, according to one embodiment of the present invention.
Figure 4:
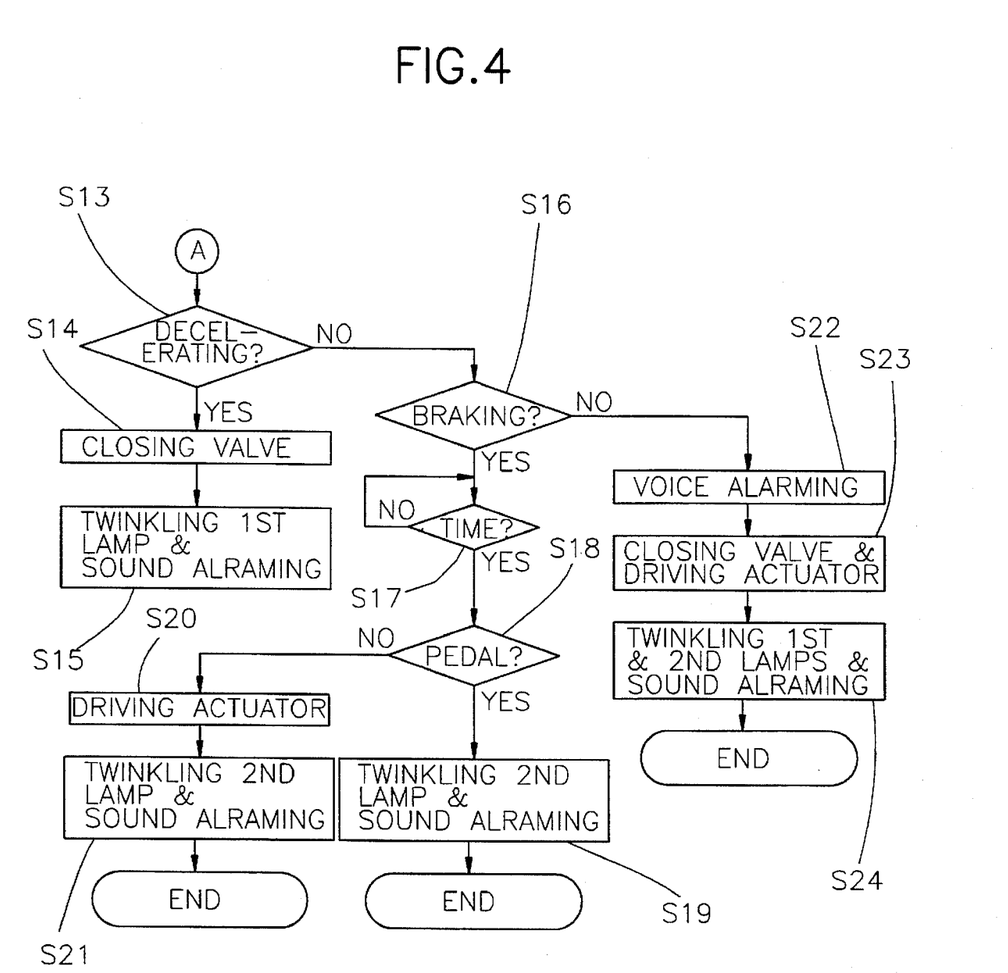

FIGS. 3 and 4 are a flow chart illustrating the operation of distinguishing the object and avoiding the collision directed by collision avoidance system 100 of the vehicle according to the preferred embodiment of the present invention.

First, camera 210, installed at the front of the vehicle, detects the shape and the temperature distribution of the object to generate shape signal SHAPE and temperature distribution signal TEMP. Radar 220 detects the position of the object to generate position signal POST, and speed sensor 230 detects the speed of the vehicle to generate speed signal VSPD. Brake sensor 240 detects whether or not the driver steps on the brake pedal to generate pedal footing signal FOOT when the brake is operated by the driver. Angular sensor 250 detects the rotative angle of the throttle valve to generate angle signal THETA (S1).

Filter 310 receives shape signal SHAPE, temperature distribution signal TEMP, position signal POST, speed signal VSPD, pedal footing signal FOOT, and angle signal THETA from detecting section 200 to filter high frequency components such as noise (S2).

A/D converter 320 converts filtered analog signals SHAPE, TEMP, POST, VSPD, FOOT, and THETA into digital signals (S3).

Digital signal processor 330 receives shape signal SHAPE and temperature distribution signal TEMP of the object from A/D converter 320 to process the received signals by a digital signal processing technique. Digital signal processor 330 eliminates the temperature distributed outside the shape of the object, and utilizes the temperature distribution only within the shape of the object, to estimate the area of the temperature distributed within the shape of the object (S4).

After calculating the temperature distribution area within the shape of the object, digital signal processor 330 assigns colors to respective temperatures distributed within the shape of the object to generate temperature distribution display signal DSTRB. The temperature distribution display is represented by, e.g., a white color WHITE for a temperature above 42.1° C., a blue color BLUE for a temperature within the range of 38.6°~42° C., a red color RED for a temperature within the range of 37.5°~38.5° C., a yellow color YELLOW for a temperature within the range of 36.5~37.4~C., a green color GREEN for a temperature within the range of 35.5°~36.4° C. and a black color BLACK for a temperature below 36° C. (S4). Temperature distribution display signal DSTRB is a signal that assigns colors based upon the temperatures and areas of temperature distribution.

After assigning the temperature distribution areas and colors within the shape of the object, digital signal processor 330 calculates the temperature occupying the widest area within the shape of the object to generate body temperature signal TEMP1 (S4).

First comparator 410 of computer 400 receives body temperature signal TEMP1 from digital signal processor 330, and compares it with preset value SET in memory 420 in order to determine whether the detected object is a human or not (S5).

At this time, examples of the body temperatures of different animals which are compared to body temperature signal TEMP1, are presented in the following table.

| KINDS | RECTUM TEMP. (°C.) | RANGE OF BODY TEMP. (MIN~MAX) |
| --- | --- | --- |
| STALLION | 37.6 | 37.2~39.1 |
| MARE | 37.8 | 37.3~38.2 |
| CAMEL | 37.5 | 34.2~40.7 |
| BEEF CATTLE | 38.3 | 36.7~39.1 |
| MILCHY COW | 38.6 | 38.0~39.3 |
| SHEEP | 39.1 | 38.3~39.9 |
| GOAT | 39.1 | 38.5~39.7 |
| PIG | 38.9 | 37.9~39.9 |
| DOG | 38.9 | 37.9~39.9 |
| CAT | 38.6 | 38.1~39.2 |
| RABBIT | 39.6 | 38.6~40.1 |
| ROOSTER | 41.7 | 40.6~43.0 |
| HUMAN | 36.9 | 36.4~37.4 |

With reference to the above table, the body temperatures of animals are higher than the body temperature of a human being, and the range in each animal's body temperature is roughly 1°~2° C. In addition, the temperature of an inanimate object is generally around the atmospheric temperature. Thus, the difference in the body temperatures of animals and of human beings are utilized to deduce the distinction between a human and an animal, an animal and an inanimate object, and an human and an inanimate object.

Therefore, first comparator 410 compares body temperature signal TEMP1 of the object with preset value SET stored in memory 420 to distinguish the object. If the object is determined to be a human by comparison of body temperature signal TEMP1 with preset value SET, first comparator 410 generates first comparison signal COMP1 (S5).

Upon the generation of first comparison signal COMP1 by first comparator 410, controller 450 generates first voice signal VOC1 and shutdown signal SHUT by receiving first comparison signal COMP1 (S6 and S7), and generates object display signal DISP by receiving shape signal SHAPE and temperature distribution signal DSTRB from digital signal processor 330 (S11).

At this time, speaker 520 receives first voice signal VOC1 to warn the driver by means of a voice (S6), and motor 620 of braking section 600 closes the throttle valve according to closing signal SHUT, which thereby decelerates the vehicle (S7).

Additionally, after monitor 510 received object display signal DISP, it displays the shape and the temperature distribution within the shape of the object in colors, so that the driver can confirm the shape and temperature distribution of the object displayed on monitor 510 with his eyes to perceive the object more clearly (S11).

If first comparator 410 determines that the object is an animal, first comparator 410 generates second comparison signal COMP2 (S8). At this time, controller 450 receives second comparison signal COMP2 to generate second voice signal VOC2 (S9), and receives shape signal SHAPE and temperature distribution signal DSTRB from digital signal processor 330 to generate object display signal DISP (S11).

Consequently, speaker 520 warns the driver via a voice by means of second voice signal VOC2 (S9), and monitor 510 displays the shape and temperature distribution of the object (S11).

On the other hand, when the object is an inanimate object, third comparison signal COMP3 is generated by first comparator 410 (S8), and controller 450 receives third comparison signal COMP3 to generate third voice signal VOC3 to speaker 520 in order to warn the driver by a voice.

Calculator 430 receives first, second, and third comparison signals COMP1, COMP2, and COMP3 from first comparator 410, and receives position signal POST, and speed signal VSPD from A/D converter 320, and previously stored data DAT from memory 420.

Calculator 430 estimates predicted collision time TCOL between the object and the vehicle by using position signal POST, speed signal VSPD and data DAT. Also, calculator 430 estimates predicted braking time TBRK, predicted decelerating time TDEC, and braking start time TSTRT (S12).

Second comparator 440 receives the estimated values TCOL, TBRK, TDEC, and TSTRT of calculator 430 to compare them with predicted collision time TCOL and predicted decelerating time TDEC. If predicted collision time TCOL is greater than predicted decelerating time TDEC, first decision signal DSC1 is generated (S13).

After first decision signal DSC1 is generated from second comparator 440, controller 450 receives first decision signal DSC1 to generate shutdown signal SHUT for driving motor 620, which closes the throttle valve (S14), to generate deceleration alarm signal DEC to twinkle first lamp 530, and to generate sound signal SND to warn the driver of the decelerating status of the vehicle via speaker 520 (S15).

Meanwhile, if predicted collision time TCOL is smaller than predicted decelerating time TDEC, second comparator 440 compares predicted collision time TCOL with predicted braking time TBRK (S16). At this time, if predicted collision time TCOL is greater than predicted braking time TBRK, then it is determined whether braking start time TSTRT of the vehicle has been reached (S17). After reaching braking start time TSTRT for braking the vehicle and receiving pedal footing signal FOOT from A/D converter 320, second comparator 440 generates second decision signal DSC2 (S18). At this time, controller 450 generates braking alarm signal BRK and sound signal SND by second decision signal DSC2. Second lamp 640 is twinkled by braking alarm signal BRK to inform the driver of the braking status of the vehicle, while speaker 520 utilized by sound signal SND to warn the driver via sound (S19).

If pedal footing signal FOOT is not received, second comparator 440 generates third decision signal DSC3 (S18). Successively, controller 450 generates braking signal ACT, braking alarm signal BRK, and sound signal SND in accordance with third decision signal DSC3 (S20 and S21), and actuator 610 receives braking signal ACT to operate the brake, which thereby brakes the vehicle (S20). Meantime, second lamp 540 is twinkled by braking alarm signal BRK and speaker 620 is utilized by sound signal SND to warn the driver (S21).

Also, if predicted collision time TCOL is smaller than predicted decelerating time TDEC and predicted braking time TBRK, then second comparator 440 generates fourth decision signal DSC4.

The generation of fourth decision signal DSC4 denotes that collision with the object cannot be avoided via just deceleration or braking. In other words, because of relative nearness of the object to the vehicle, the driver is incapable of avoiding the collision by only deceleration or only braking. Therefore, the driver should be informed of the urgent condition and the vehicle should be decelerated while performing the braking operation.

Consequently, by the generation of fourth decision signal DSC4, controller 450 primarily generates fourth voice signal VOC4 to warn the driver of the urgent condition via speaker 520 (S22). Simultaneously, shutdown signal SHUT and braking signal ACT are generated to close the throttle valve in order to decelerate the vehicle while actuator 610 brakes the vehicle (S23). Additionally, deceleration alarm signal DEC and braking alarm signal BRK are generated to twinkle first and second lamps 530 and 540 to visually warn the driver of the decelerating and braking status of the vehicle, and sound signal SND is generated to aurally warn the driver of the current decelerating and braking status of the vehicle (S24).

As described above, a method for avoiding the collision of vehicle can distinguish whether an object is a human, an animal or an inanimate object, so proper measure can be taken based on the kind of the object by detecting the position of the object ahead of and/or to the side of the vehicle. Additionally, the collision avoidance system of the vehicle according to the present invention can avoid a collision with the object without fail by decelerating only, by braking only, or by performing both of deceleration and braking the vehicle, based on the position of the object, the vehicle speed, and the braking status of the vehicle.

Furthermore, the collision avoidance system of the vehicle according to the present invention displays the shape and the temperature distribution of the object on a monitor when the object is determined to be a living creature to allow the driver to directly confirm the object even while driving at night.

While the present invention has been particularly shown and described with reference to preferred embodiment thereof, it will be understood by those skilled in the art that the foregoing and other changes in form and details may be made therein without departing from the spirit and scope of the present invention.

What is claimed is:

1. A method for avoiding a collision of a vehicle comprising the steps of:

A) detecting a shape and a temperature distribution of an object ahead of and/or aside of the vehicle, and a position of the object, a speed of the vehicle, an operational status of a brake and an opening angle of a throttle valve so as to generate a shape signal, a temperature distribution signal, a position signal, a speed signal, a pedal footing signal and an angle signal;

B) filtering and converting the shape signal, temperature distribution signal, position signal, speed signal, pedal footing signal and angle signal into digital signals, processing the shape signal and the temperature distribution signal by means of digital signal processing technique and generating a body temperature signal and a temperature distribution display signal by calculating a temperature distributing area of the shape of the object;

C) determining a kind of the object by receiving the body temperature signal, estimating a predicted collision time, a predicted braking time, a predicted decelerating time and a braking start tme by receiving the position signal and speed signal, determining one of cases of braking, decelerating and braking with decelerating the vehicle by using the predicted collision time, the predicted braking time, the predicted decelerating time and the braking start time, and generating an alarm signal and a control signal by receiving the shape signal, the temperature distribution display signal and the angular signal, wherein by comparing the body signal and a preset value a first comparison signal is generated when the object is determined to be a human, a second comparison signal is generated when the object is determined as an animal and a third comparison signal is generated when the object is determined to be an inanimate object;

the predicted collision time, the predicted braking time, the predicted decelerating time and the braking start time are estimated by using the position signal, the speed signal and prestored data when the first, second and third comparison signals are received;

a first decision signal is generated when the predicted collision time is greater than the predicted decelerating time, a second decision signal is generated when i) the predicted collision time is greater than the predicted braking time, ii) the predicted collision time reaches the braking start time and iii) the pedal footing signal is received, and a third decision signal is generated when the pedal footing signal is not received, and a fourth decision signal is generated when the predicted collision time is less than the predicted braking time; and a first voice signal, a closing signal based on the angle signal for closing the throttle valve and an object display signal are generated when the first comparison signal is received, a second voice signal and the object display signal are generated when the second comparison signal is received, a third voice signal is generated when the third comparison signal is received, the closing signal based on the angle signal for closing the throttle valve, a deceleration alarm signal and a sound signal are generated when the first decision signal is received, a braking signal and the sound signal are generated when the second decision signal is received, the braking signal, braking alarm signal and the sound signal are generated when the third decision signal is received, and a fourth voice signal, the closing signal, the braking signal, deceleration alarm signal, the braking alarm signal and the sound signal are generated when the fourth decision signal is received;

D) alarming a driver of decelerating and braking statuses of the vehicle according to an appearance of the object according to the alarm signal; and E) decelerating and braking the vehicle according to the control signal.

2. A method as claimed in claim 1, wherein said step A) detects the shape and the temperature distribution of the object by means of infrared rays.

3. A method as claimed in claim 1, said step B) further comprising the steps of:

eliminating the temperature distribution outside of the shape of the object by using the digital converted shape signal and temperature distribution signal;

assigning respective colors to temperatures distributed within the shape of the object;

generating the temperature distribution display signal by calculating an area of the temperature distributing within the shape of the object; and generating the body temperature signal by calculating the temperature distributed in the widest area within the shape of the object.

4. A method as claimed in claim 1, wherein the alarm signal includes the first, second, third and fourth voice signals, the object display signal, the deceleration alarm signal, the braking alarm signal and the sound signal.

5. A method as claimed in claim 1, wherein the control signal includes the braking signal and the closing signal.

6. A method as claimed in claim 1, wherein said step D) comprising the steps:

displaying the shape and the temperature distribution of the object by the object display signal;

warning vocally and audibly according to the first, second, third and fourth voice signals and sound signals;

warning the vehicle being decelerated by the deceleration alarm signal; and warning the vehicle being braked by the braking alarm signal.

7. A method as claimed in claim 1, wherein said step E) comprising the steps:

closing the throttle valve by the closing signal; and driving the brake of the vehicle by the braking signal.

8. A method for avoiding collision of a vehicle comprising the steps of:

A) detecting a shape and a temperature distribution of an object ahead of and/or aside of the vehicle by using infrared rays, a position of the object, a speed of the vehicle, an operational status of a brake and an opening angle of a throttle valve to generate a shape signal, a temperature distribution signal, a position signal, a speed signal, a pedal footing signal and an angle signal;

B) i) filtering and convening the shape signal, the temperature distribution signal, the position signal, the speed signal, the pedal footing signal and the angle signal into digital signals, ii) eliminating the temperature distribution outside of the shape of the object by using the digital converted shape signal and temperature distribution signal, iii) assigning respective colors to temperatures distributed within the shape of the object, iv) generating a temperature distribution display signal by calculating an area of the temperature distributing within the shape of the object and v) generating a body temperature signal by calculating the temperature distributed in the widest area within the shape of the object;

C) generating a first comparison signal when the object is determined to be a human, generating a second comparison signal when the object is determined to be an animal and generating a third comparison signal when the object is determined to be an inanimate object by comparing the body signal and a preset value;

D) estimating a predicted collision time, a predicted braking time, a predicted decelerating time and a braking start time by using the position signal, the speed signal and prestored data when the first, second and third comparison signals are received;

E) generating a first decision signal when the predicted collision time is greater than the predicted decelerating time, generating a second decision signal when i) the predicted collision time is greater than the predicted braking time, ii) the predicted collision time reaches the braking start time and iii) the pedal footing signal is received, and generating a third decision signal when the pedal footing signal is not received, and generating a fourth decision signal when the predicted collision time is less than the predicted braking time;

F) generating a first voice signal, a closing signal based on the angle signal for closing the throttle valve and an object display signal when the first comparison signal is received, generating a second voice signal and the object display signal when the second comparison signal is received, generating a third voice signal when the third comparison signal is received, generating the closing signal based on the angle signal for closing the throttle valve, a deceleration alarm signal and a sound signal when the first decision signal is received, generating a braking signal and the sound signal when the second decision signal is received, generating the braking signal, braking alarm signal and the sound signal when the third decision signal is received, and generating a fourth voice signal, the closing signal, the braking signal, deceleration alarm signal, the braking alarm signal and the sound signal when the fourth decision signal is received;

G) displaying the shape and the temperature distribution of the object by the object display signal, warning vocally and audibly according to the first, second, third and fourth voice signals and sound signals, warning the vehicle being decelerated by the deceleration alarm signal, and warning the vehicle being braked by the braking alarm signal; and H) closing the throttle valve by the closing signal and driving the brake of the vehicle by the braking signal.

9. A system for avoiding collision of a vehicle comprising:

a means for detecting a shape and a temperature distribution of an object ahead of and/or aside of the vehicle, and a position of the object, a speed of the vehicle, an operational status of a brake and an opening angle of a throttle valve so as to generate a shape signal, a temperature distribution signal, a position signal, a speed signal, a pedal footing signal and an angle signal;

a signal processing means for filtering and converting the shape signal, temperature distribution signal, position signal, speed signal, pedal footing signal and angle signal into digital signals, processing the shape signal and the temperature distribution signal by means of digital signal processing technique and generating a body temperature signal and temperature distribution display signal by calculating a temperature distributing area of the shape of the object;

a means for determining a kind of the object by receiving the body temperature signal, estimating a predicted collision time, a predicted braking time, a predicted decelerating time and a braking start time by receiving the position signal and speed signal, determining one of cases of only braking, both of decelerating and braking while decelerating the vehicle by using the predicted collision time, the predicted braking time, the predicted decelerating time and the braking start time, and generating an alarm signal and a control signal by receiving the shape signal, the temperature distribution display signal and the angular signal, wherein said determining means comprises a) a memory for restoring a preset value and data; b) a first comparator for generating a first comparison signal when the object is determined to be a human, for generating a second comparison signal when the object is determined to be an animal and for generating a third comparison signal when the object is determined to be an inanimate object by comparing the body temperature signal and the preset value; c) a calculator for estimating the predicted collision time, the predicted braking time, the predicted decelerating time and the braking start time by using the position signal, the speed signal and the data when the first, second and third comparison signals are received; d) a second comparator for generating a first decision signal when the predicted collision time is greater than the predicted decelerating time, generating a second decision signal when i) the predicted collision time is greater than the predicted braking time, ii) the predicted collision time reaches the braking start time and iii) the pedal footing signal is received, and generating a third decision signal when the pedal footing signal is not received, and generating a fourth decision signal when the predicted collision time is less than the predicted braking time; and e) a controller for generating a first voice signal, a closing signal based on the angle signal for closing the throttle valve, and an object display signal when the first comparison signal is received, for generating a second voice signal and the object display signal when the second comparison signal is received, for generating a third voice signal when the third comparison signal is received, for generating the closing signal based on the angle signal for closing the throttle valve, a deceleration alarm signal and a sound signal when the first decision signal is received, for generating a braking signal and the sound signal when the second decision signal is received, for generating the braking signal, braking alarm signal and the sound signal when the third decision signal is received, and for generating a fourth voice signal, the closing signal, the braking signal, deceleration alarm signal, the braking alarm signal and the sound signal when the fourth decision signal is received;

a means for alarming of decelerating and braking statuses of the vehicle according to an appearance of the object according to the alarm signal; and a means for decelerating and braking the vehicle according to the control signal.

10. A system as claimed in claim 9, said detecting means comprising:

a camera for detecting the shape and the temperature distribution of the object by means of infrared rays and generating the shape signal and the temperature distribution signal;

a radar for detecting the position of the object and generating the position signal;

a speed sensor installed in the vehicle for detecting the speed of the vehicle and generating the speed signal;

a brake sensor for detecting an operational status of a brake and generating the pedal footing signal when the brake is operated; and an angular sensor for detecting the opening angle of a throttle valve and generating the angle signal.

11. A system as claimed in claim 9, said signal processing means comprising;

a filter for filtering the shape signal, temperature distribution signal, position signal, speed signal, pedal footing signal and angle signal;

a analog/digital converter for converting the shape signal, temperature distribution signal, position signal, speed signal, pedal footing signal and angle signal into digital signals; and a digital signal processing section for eliminating the temperature distribution outside of the shape of the object by using the digital converted shape signal and temperature distribution signal, for assigning respective colors to temperatures distributed within the shape of the object, for generating the temperature distribution display signal by calculating an area of the temperature distributing within the shape of the object, and generating the body temperature signal by calculating the temperature distributed in the widest area within the shape of the object.

12. A system as claimed in claim 9, wherein the alarm signal includes the first, second, third and fourth voice signals, the object display signal, the deceleration alarm signal, the braking alarm signal and the sound signal.

13. A system as claimed in claim 9, wherein the control signal includes the braking signal and the closing signal.

14. A system as claimed in claim 9, said alarm means comprising:

a monitor for displaying the shape and the temperature distribution of the object according to the object display signal;

a speaker for warning vocally and audibly according to the first, second, third and fourth voice signals and sound signal;

a first lamp for warning the vehicle being decelerated by the deceleration alarm signal; and a second lamp for warning the vehicle being braked by the braking alarm signal.

15. A system as claimed in claim 9, said decelerating and braking means comprising:

a motor for closing the throttle valve by the closing signal; and an actuator for driving the brake of the vehicle by the braking signal.

16. A system for avoiding collision of a vehicle comprising:

a camera for detecting a shape and a temperature distribution of an object by means of infrared rays and generating a shape signal and a temperature distribution signal;

a radar for detecting a position of the object and generating a position signal;

a speed sensor installed in the vehicle for detecting a speed of the vehicle and generating a speed signal;

a brake sensor for detecting an operational status of a brake and generating a pedal footing signal when the brake is operated;

an angular sensor for detecting an opening angle of a throttle valve and generating an angle signal;

a filter for filtering the shape signal, temperature distribution signal, position signal, speed signal, pedal footing signal and angle signal;

an analog/digital converter for converting the shape signal, temperature distribution signal, position signal, speed signal, pedal footing signal and angle signal into digital signals;

a digital signal processing section for eliminating the temperature distribution outside of the shape of the object by using the digital converted shape signal and temperature distribution signal, for assigning respective colors to temperatures distributed within the shape of the object, for generating a temperature distribution display signal by calculating an area of the temperature distribution within the shape of the object, and for generating a body temperature signal by calculating the widest distributed temperature within the shape of the object;

a memory for restoring a preset value and data;

a first comparator for generating a first comparison signal when the object is determined to be a human, for generating a second comparison signal when the object is determined to be an animal and for generating a third comparison signal when the object is determined to be an inanimate object by comparing the body temperature signal and the preset value;

a calculator for estimating a predicted collision time, a predicted braking time, a predicted decelerating time and a braking start time by using the position signal, the speed signal and the data when the first, second and third comparison signals are received;

a second comparator for generating a first decision signal when the predicted collision time is greater than the predicted decelerating time, generating a second decision signal when i) the predicted collision time is greater than the predicted braking time, ii) the predicted collision time reaches the braking start time and iii) the pedal footing signal is received, and generating a third decision signal when the pedal footing signal is not received, and generating a fourth decision signal when the predicted collision time is less than the predicted braking time;

a controller for generating a first voice signal, a closing signal based on the angle signal for closing the throttle valve and an object display signal when the first comparison signal is received, for generating a second voice signal and the object display signal when the second comparison signal is received, for generating a third voice signal when the third comparison signal is received, for generating the closing signal based on the angle signal for closing the throttle valve, a deceleration alarm signal and a sound signal when the first decision signal is received, for generating a braking signal and the sound signal when the second decision signal is received, for generating the braking signal, braking alarm signal and the sound signal when the third decision signal is received, and for generating a fourth voice signal, the closing signal, the braking signal, deceleration alarm signal, the braking alarm signal and the sound signal when the fourth decision signal is received;

a monitor for displaying the shape and the temperature distribution of the object by the object display signal;

a speaker for warning vocally and audibly according to the first, second, third and fourth voice signals and sound signal;

a first lamp for warning the vehicle being decelerated by the deceleration alarm signal;

a second lamp for warning the vehicle being braked by the braking alarm signal;

a motor for closing the throttle valve by the closing signal; and an actuator for driving the brake of the vehicle by the braking signal.

* * * * *